Figure 1:
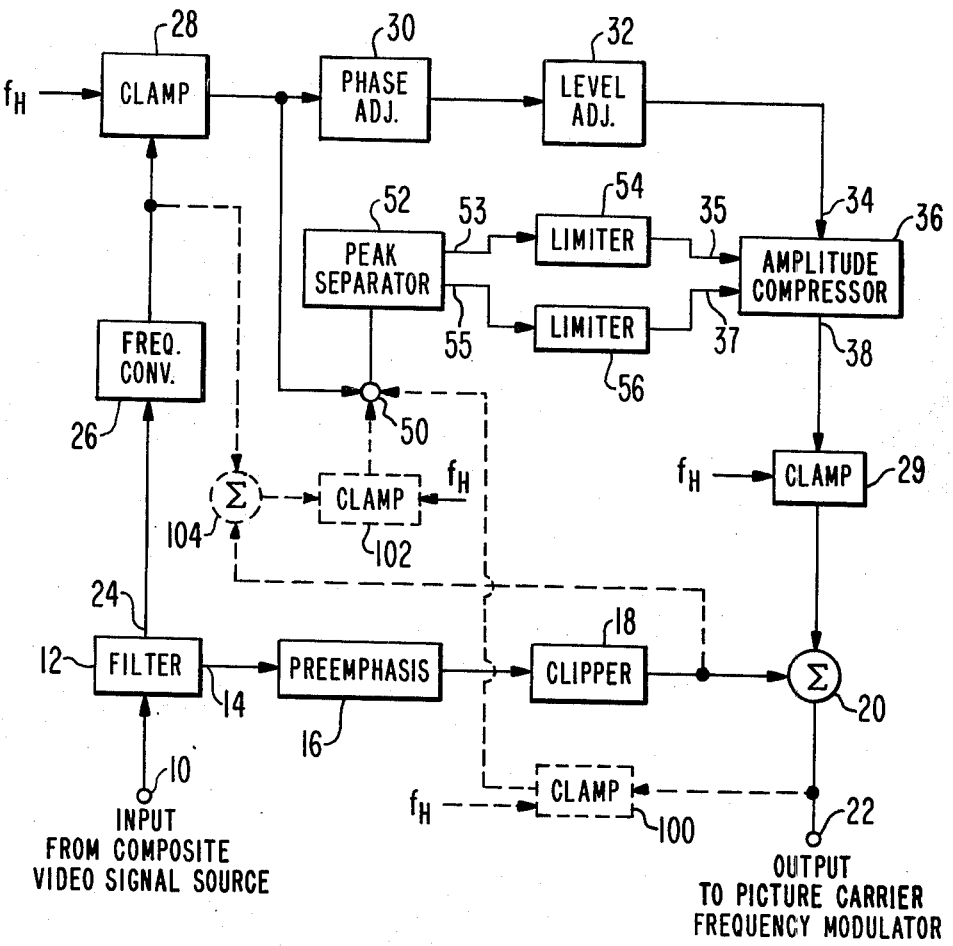

United States Patent [19]

Wharton et al.

[11] 4,316,213
[45] Feb. 16, 1982

[54] VIDEO PROCESSOR EMPLOYING VARIABLE AMPLITUDE COMPRESSION OF THE CHROMINANCE COMPONENT

[75] Inventors: James H. Wharton; Jack E. James, both of Indianapolis, Ind.

[73] Assignee: RCA Corporation, New York, N.Y.

[21] Appl. No.: 190,082

[22] Filed: Sep. 23, 1980

[51] Int. Cl.³ .................... H04N 9/493; H04N 9/38; H04N 9/535

[52] U.S. Cl. .......................................... 358/11; 358/4; 358/27

[58] Field of Search ............................. 358/4, 27, 11

[56] References Cited

U.S. PATENT DOCUMENTS

| | | | |
|---|---|---|---|
| 3,934,263 | 1/1976 | Palmer | 358/4 |
| 4,005,474 | 1/1977 | Keizer | 358/4 |
| 4,007,483 | 2/1977 | Pham van Cang | 358/4 |
| 4,022,968 | 5/1977 | Keizer | 358/128 |
| 4,096,513 | 1/1978 | Ross | 358/4 |

*Primary Examiner*—John C. Martin

*Attorney, Agent, or Firm*—E. M. Whitacre; J. S. Tripoli; R. G. Coalter

[57] ABSTRACT

A composite video signal is separated into luminance and chrominance components which are processed in separate channels having transfer functions which differ in terms of frequency response and large signal amplitude response. The luminance channel subjects the luminance signal to high frequency preemphasis and to hard limiting or clipping at predetermined fixed levels. The chrominance channel exhibits a substantially uniform amplitude response and a variable compression characteristic dependent upon the chrominance signal level, a sum of chrominance and processed luminance signals or a composite output signal formed by a sum of processed chrominance and processed luminance signals. The composite signal is suitable for application to a picture carrier frequency modulator whereby an FM signal is produced suitable for video disc or tape recording and in which a tendency for luminance-chrominance crosstalk or interference is minimized.

7 Claims, 2 Drawing Figures

VIDEO PROCESSOR EMPLOYING VARIABLE AMPLITUDE COMPRESSION OF THE CHROMINANCE COMPONENT

This invention relates to video signal processing apparatus and particularly to apparatus for forming a modulating signal for a picture carrier frequency modulator in systems, such as video disc or tape recording systems, that employ FM techniques in the translation of color picture information.

In certain color picture information processing systems, it is advantageous to employ FM techniques in the translation of video information. See, for example, U.S. Pat. Nos. 3,934,263; 4,022,968; and 4,005,474 which disclose video disc recording arrangements in which a recording signal is formed which includes a picture carrier wave modulated in frequency in accordance with the amplitude of a composite color video signal inclusive of luminance and chrominance components.

In such video disc (or tape) recording systems, bandwidth limitations of the recording media can limit the modulation index for the higher frequency components of the video signal to such an extent that a signal-to-noise ratio loss may occur for signal frequency components near the higher end of the modulating signal bandwith. For this reason, it is conventional practice in disc and tape recording systems to translate the chrominance signal from its normal location at the upper end of the luminance band to a lower frequency so that the chrominance component does not suffer a signal-to-noise ratio loss. Pritchard, in U.S. Pat. No. 3,872,498 discloses translating systems which interleave or "bury" chrominance signal within the midband portion of the luminance signal. This is commonly referred to as "buried subcarrier" encoding and prevents degradation of the chrominance signal-to-noise ratio for the reasons mentioned above.

While the chrominance signal-to-noise ratio may be preserved (or improved) by means of buried subcarrier encoding, a different approach is required to overcome the loss which occurs for higher frequency luminance components. Conventionally, the luminance signal is subjected to high frequency preemphasis prior to modulation of the FM carrier so that a signal-to-noise ratio improvement may be realized when a complementary high frequency deemphasis is imparted to the luminance component subsequent to demodulation of the FM carrier (e.g., in a disc or tape player). To prevent the preemphasized luminance signal from causing excessive carrier deviation of the frequency modulator it has been proposed that the luminance signal be clipped at predetermined levels, summed with the chrominance signal to form a composite signal which is then clipped and applied to the modulator.

It has been found that when a video signal is conditioned generally as hereinbefore described and used, for example, to drive the cutterhead of a video disc mastering lathe, that certain undesirable effects may be observable in a picture produced when the mastering substrate or a pressed disc is played back and displayed on a TV monitor. In particular, it has been observed that for certain program material the chrominance content of the picture may tend to influence the picture luminance level and flesh tones may tend to exhibit an unnatural hue.

The present invention is directed to meeting the need for video signal processing apparatus of the general type described above in which the undesirable effects of chrominance-luminance interference and hue shifts are reduced. Apparatus in accordance with the invention includes filter means for separating a composite video input signal into a luminance component and a chrominance component. A first signal processing means provides preemphasis and clipping of the luminance component and a second signal processing means compresses the chrominance component in response to peaks in excess of a given value of a control signal supplied thereto. Means are provided for summing the preemphasized and clipped luminance component produced by the first signal processing means with the controllably compressed chrominance component produced by the second signal processing means to produce a composite video signal for application to a frequency modulator means. Means are provided for deriving the control signal from a selected one of (1) the chrominance component of the composite video input signal, (2) a sum of the chrominance component of the composite video input signal and the preemphasized and clipped luminance signal and (3) the output composite video signal.

In accordance with another aspect of the invention the second signal processing means includes means for limiting the magnitude of the control signal to a predetermined value.

IN THE DRAWINGS

Figure 2:
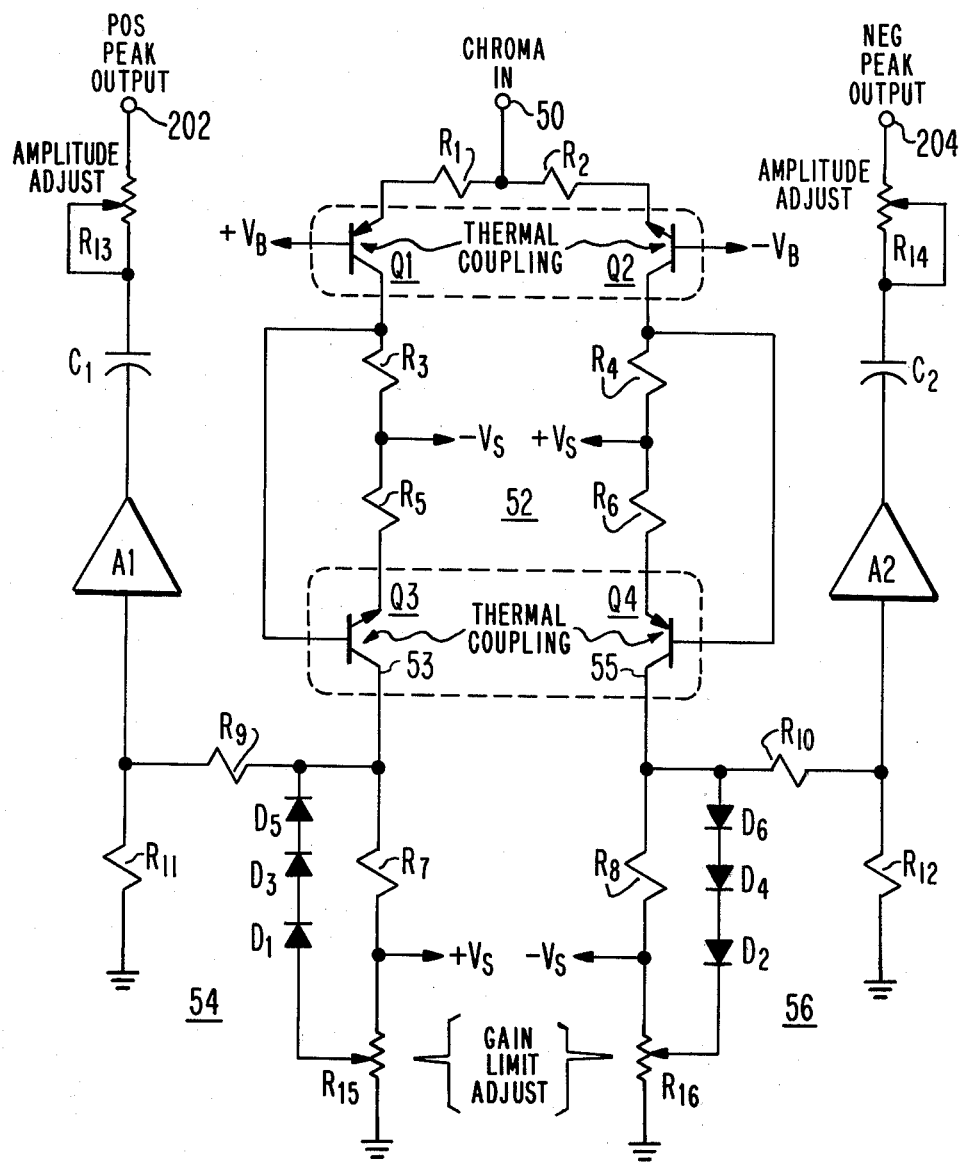

FIG. 1 is a block diagram of video signal processing apparatus embodying the invention and including, as indicated by phantom lines, two alternatives for generation of a chrominance channel compression control signal; and FIG. 2 is a circuit diagram of a preferred implementation of the peak separation and limiting circuitry shown in FIG. 1.

In the example of FIG. 1, the luminance and chrominance components of the composite video signal are processed in separate channels having transfer functions which differ in terms of both small signal frequency response and large signal amplitude response. The luminance channel, for example, subjects the luminance signal to high frequency preemphasis and hard limiting or clipping at predetermined fixed levels. Conversely, the chrominance channel exhibits a substantially uniform frequency response and a signal level dependent variable compression characteristic. The benefits of the invention are a result of synergistic effects produced by these differences in the luminance and chrominance channel transfer functions.

Initially, only the elements indicated by solid lines in the drawing will be discussed. The elements indicated in phantom (i.e., by broken lines) modify the chrominance channel compression characteristic and will be discussed subsequently. As an illustration of a preferred application of the principles of the invention, the apparatus is arranged to provide conversion of a composite video signal of a standard format to one of the previously mentioned buried subcarrier format proposed by Pritchard. The composite output signal produced by the apparatus is suitable for application to a frequency modulator for producing a picture carrier wave suitable for recording on bandwidth limited media such as video discs or tapes or for transmission through other relatively narrow band transmission channels or media. For ease of illustration it is assumed that the composite video input signal is of NTSC format. The principles of the invention are readily adaptable, however, to other video standards such as PAL or SECAM by appropriate modification of the chrominance conversion portion of the apparatus to conform to parameters of the selected standard (e.g., subcarrier frequency, bandwith, etc.).

The composite video signal is applied to an input terminal 10 and separated into luminance and chrominance components by means of filter 12. Preferably, filter 12 is a comb filter of the type described in the aforementioned Pritchard patent in which the luminance passband exhibits recurring peaks at multiples of the line frequency and in which the chrominance passband is complementary (i.e., it exhibits recurring peaks at odd multiples of half the line frequency and nulls at multiples of the line frequency).

The purpose of separating the luminance and chrominance signals by means of comb filtering (rather than simple lowpass and high pass filtering) is to prepare troughs in the luminance signal band for receiving the chrominance signal after translation of the chrominance signal to a lower frequency. Since the chrominance signal is comb filtered with a complementary characteristic, it can be interleaved with the luminance signal with little "crosstalk" by appropriate choice of the new chrominance subcarrier frequency. An illustrative subcarrier frequency choice is one incorporating a half line rate offset such as 195/2) fH or approximately 1,534,091 Hz (hereinafter 1,53 MHz) when the apparatus of FIG. 1 is used for processing NTSC standard input signals.

The separated luminance signal produced at output 14 of filter 12 is preemphasized by means of preemphasis circuit 16, clipped (i.e., limited to predetermined fixed levels) by means of clipper circuit 18 and applied to one input of a summing circuit 20. Circuit 20 combines the preemphasized and clipped luminance signal with a controllably compressed chrominance signal to produce a resultant output signal at ouput terminal 22 for application to a picture carrier frequency modulator.

Preemphasis circuit 16 may comprise a resistance-capacitance lead-lag network such as that shown in U.S. Pat. No. 4,096,513 of M. D. Ross or a resistance-inductance lead-lag network as shown for example in the U.S. Patent Application of T. J. Christopher, Ser. No. 20,334 filed Mar. 14, 1979, now abandoned. Illustratively, the preemphasis network parameter may be selected to provide a lead break point at 0.25 MHz, a lag break point of 1.0 MHz and a slope of 6 dB per octave to provide a net boast of 12 dB to the higher frequency luminance components. A preferred preemphasis circuit is disclosed in the copending U.S. Patent Application of J. G. Amery and J. H. Wharton Ser. No. 163,275 filed June 26, 1980, and entitled "VIDEO SIGNAL PROCESSING APPARATUS", now abandoned. In the Amery, et al. application, additional preemphasis is imparted to the luminance signal above the lag breakpoint of the lead lag network by means of filters having a linear phase (minimal overshoot) characteristic.

Clipper circuit 18 limits the luminance signal amplitude to fixed levels and may comprise a conventional diode or common base connected transistor voltage limiter. Preferably clipper circuit 18 is of the interactive type which, when activated, increases the time constant of the lead-lag network of preemphasis circuit 16 to "stretch" or prolong clipped signals in accordance with the teachings of Christopher in his aforementioned patent application. As explained in detail in the Christopher application, the maintenance of clipping beyond the time it would normally terminate provides a reduction of clipping distortion by, if effect, replacing a portion of the luminance signal energy lost through conventional clipping with additional pulse energy provided by stretching or prolonging the clipped waveform.

The chrominance signal produced at output 24 of filter 12 is converted from the NTSC subcarrier frequency (about 3.5 MHz) to the buried subcarrier frequency (1.53 MHz) by means of frequency converter 26. Preferably, converter 26 is of the well known heterodyne type as described, for example, in the aforementioned Pritchard patent.

The frequency converted "buried subcarrier" chrominance signal produced at the output of converter 26 is applied via a cascade connection of a clamp circuit 28, a phase adjusting circuit 30 and a level adjusting circuit 32 to the signal input terminal 34 of an amplitude compressor 36 the output terminal 38 of which is coupled via another clamp circuit 29 to the second input of summing circuit 20. The output of clamp circuit 28 is also connected to the input terminal 50 of a peak separator 52 having a first output 53 coupled via a positive peak limiter 54 to a first control input terminal 35 of compressor 36 and a second output 55 coupled via a negative peak limiter 56 to a second control input 37 of compressor 36.

Clamp circuits 28 and 29 are enabled by line frequency pulses fH supplied to control inputs thereof to establish a precise d.c. reference level for the chrominance signal applied to and produced by the chrominance signal processing means comprising elements 30–56. Illustratively, each may be implemented by means of a d.c. blocking capacitor connected between the clamp circuit input and output terminals and a transistor having a conduction path connected between the clamp circuit output terminal and a suitable point of reference potential (e.g., ground). To avoid clamping the chrominance signal during either the burst or the active scan intervals of the chrominance signal, the line rate pulses fH should be applied to the transistor control electrode during the sync tip interval. Clamp circuit 28 and/or 29 may be omitted in cases where the d.c. stability of frequency converter 26 and/or amplitude compressor 36 is adequate. Alternatively, the d.c. level of the chrominance processing means input and output signals may be controlled by means of detectors which detect the average value of the signals and regulators which combine compensating signals with the input and output chrominance signals in a sense to regulate the quiescent d.c. levels.

Phase adjusting circuit 30 is preferably of the constant amplitude all-pass type such as a delay line or an active filter. It is included in the chrominance signal path to compensate for phase errors which may be introduced, for example, by amplitude compressor 36 or frequency converter 26. Level adjusting circuit 32, illustratively, may be a potentiometer, and is included in the chrominance signal processing path for setting the chrominance level. For this purpose it may be interposed at any suitable point in the chrominance signal path but preferably subsequent to down conversion of the chrominance signal by converter 26. It has been found preferable in video disc mastering application to amplify the chrominance signal and the burst component by a factor of three prior to combining the chrominance and luminance signals. This has been found to effect a desirable chrominance signal-to-noise ratio enhancement.

Amplitude compressor 36 may be either of the subtractor type or the multiplier type, its function being to reduce the amplitude of the chrominance signal in response to the presence of a control signal of appropriate polarity at either of its inputs 35 and 37. A simple form of subtractive compressor could be formed by coupling input terminals 34, 35 and 37 to a summing junction and inverting either the polarity of the signal supplied to terminal 34 or the polarity of both signals supplied to terminals 35 and 37. In the presently preferred embodiment of the invention, amplitude compressor 36 comprises a four quadrant multiplier of the well known Gilbert cell type (see, for example, the article "Linear IC's" by D. Ranada in the Aug. 20, 1979 edition of the magazine EDN, pp71–75). A preferred multiplier is the type MC1596L integrated circuit manufactured, for example, by Motorola Corporation which has differential input terminals corresponding to terminals 35 and 37 of compressor 36.

Peak separator 52 provides plural functions of separating positive and negative peaks of the chrominance signal applied to terminal 50, amplifying the separated signal peaks and referencing the amplified separated signal peaks to the reference level established by clamp circuit 28 (e.g., ground). The positive signal peaks, thus conditioned and appearing at terminal 53, are limited to a predetermined magnitude by means of limiter 54 prior to application thereof to control terminal 35 of compressor 36. The similarly conditioned negative signal peaks appearing at terminal 55 are similarly limited to a predetermined magnitude by limiter 56 and applied to terminal 37 of compressor 36.

One possible implementation of peak separator 52 would be to apply the chrominance signal to a coring circuit for separating the peaks from the remainder of the signal, amplifying the peaks and then separating the positive polarity amplified peaks from the negative polarity amplified peaks by means, for example, of diodes. A simplified and preferred implementation of peak separator 52 and limiters 54 and 56 is illustrated in FIG. 2 and will be discussed subsequently.

It is helpful in understanding the theory of the invention to note the fundamental distinction in the manner of control of the chrominance signal amplitude relative to that of the luminance signal. Peaks of the preemphasized luminance signal greater than the threshold of clipper circuit 18 are truncated or cut off abruptly. If the chrominance signal was also clipped it is possible that a second harmonic (3.06 MHz) of the buried subcarrier chrominance signal (1.53 MHz) could be produced. This second harmonic lies near the upper end of the luminance signal band (3.0 MHz) and, as a practical matter, is difficult if not impossible to remove by filtering. A visual effect of its presence in the luminance signal is the formation of color "beats" i.e., variations of brightness with the level of color saturation. Picture streaking as well as color "beats" is another possible undesirable effect.

The above problems are minimized in the example of FIG. 1 by means of compressor 36 which, rather than clipping the chrominance signal, reduces its amplitude when either a positive or a negative chrominance signal peak exceeds the threshold of peak separator 52. It is instructive to note that peak separator 52 operates on an essentially instantaneous basis and no averaging or envelope detection is employed in production of the compressor control signals. Because of this, the compressor attack and release times are essentially instantaneous and undesirable effects characteristic of envelope controlled compressors (e.g., prolonged transient recovery time) are completely eliminated.

Limiters 54 and 56 provide the desirable feature of preventing hue inversions which might result under certain signal conditions. As an example, when compressor 36 is implemented by means of a multiplier biased to exhibit a given quiescent gain (e.g., unity) and a chrominance transient occurs having peaks greater than the multiplier bias level, a polarity reversal at terminals 35 and 37 can occur. If the multiplier is of the four quadrant type, a polarity reversal at its control terminals will cause a phase inversion at its output terminal thereby resulting in hue inversion. Depending on the relative signal levels a change in saturation level can also result. These problems are avoided by setting the threshold levels of limiters 54 and 46 at a level less than the quiescent bias level of the multiplier.

The apparatus of FIG. 1 may be modified as indicated by the elements shown in phantom to obtain the control signal for peak separator 52 from either the output signal produced at terminal 22 or from a sum of the chrominance component of the composite video input signal and the preemphasized and clipped luminance signal. In the former case, terminal 50 is disconnected from the output of clamp circuit 28 and coupled to output terminal 22 via a further clamp circuit 100. In the latter case, terminal 50 is disconnected from the output of clamp circuit 28 and coupled via a further clamp circuit 102 to the output of summing circuit 104 which has inputs connected to the outputs of clipper 18 and frequency converter 26.

The alternatives for controlling peak separator 52 provide the advantage that where the luminance signal level is relatively low, very large peaks of the chrominance signal can pass through compressor 36 without alteration since peak separator 52 is responsive to a sum rather than the chrominance signal alone. As a result, color fidelity is greatly improved since under such conditions the compressor acts as linear element and does not alter the shape of the chrominance channel transfer function. The compressor, in other words, is activated only when the whole video signal, rather than a component of it, exceeds the predetermined limits set by peak separator 52.

In FIG. 2 input terminal 50 of peak separator 52 is coupled to the emitters of a pair of thermally coupled complementary PNP and NPN transistors Q1 and Q2 via respective emitter resistors R1 and R2. Transistors Q1 and Q2 are operated as common base amplifiers by application of positive bias $+Vb$ to the base of Q1 and negative bias $-Vb$ to the base of Q2. The collectors of Q1 and Q2 are coupled to respective negative and positive supply voltage sources, $-Vs$ and $+Vs$, via respective collector load resistors R3 and R4 and to respective base electrodes of thermally coupled complementing NPN and PNP transistors Q3 and Q4. The emitters of transistors Q3 and Q4 are coupled via respective emitter degeneration resistors R5 and R6 to respective negative and positive supply voltage sources $-Vs$ and $+Vs$. The collectors 53 and 55 of transistors Q3 and Q4 are coupled, respectively, to the positive and negative supply voltage sources $+Vs$ and $-Vs$ via respective collector load resistor R7 and R8 and to the inputs of respective buffer amplifiers A1 and A2 via respective resistive attenuators R9, R11 and R10, R12. The output of amplifier A1 is coupled to positive peak output terminal 202 via a cascade connection of a d.c. blocking capacitor C1 and amplitude adjustment potentiometer R13. The output of amplifier A2 is coupled to negative peak output terminal 204 via a cascade connection of a d.c. blocking capacitor C2 and an amplitude adjustment potentiometer R14. Each potentiometer is connected to vary the output impedance at its respective output terminal and thus the potentiometers provide controllable current drive to subsequent circuitry (i.e., to terminals 35 and 37 of compressor 36). If voltage control rather than current control of the output signals is desired the potentiometers could be deleted from the buffer amplifier output circuits and used to replace the fixed attenuators R9, R11 and R10, R12.

The elements of FIG. 2 described thus far provide threshold control, peak separation, peak amplification and peak output current limiting in response to signals supplied to terminal 50. If, for example, a signal more positive than $+Vb$ plus $V_{be}$ of Q1 is applied to terminal 50 transistor Q1 will turn on and a voltage will be developed across its collector load resistor R3 proportioned to the current flow through emitter resistor R1. The ratio of the collector and emitter resistors R2/R1 determines the stage gain and illustratively may be on the order of 10:1. The voltage appearing across R3 will turn on transistor Q3 which serves as a common emitter amplifier providing signal inversion and additional gain determined by the ratio R7/R5 (ignoring, for the moment, the effects of diodes D1, D3 and D5 and potentiometer R15). Illustratively, the ratio R7/R5 may be on the order of 10:1 so that the net gain of the Q1 and Q3 stages is 100:1 or 40 dB for input signal voltages greater than $+Vb$ plus $V_{be}$ of Q1.

The voltage appearing at the collector of Q3 will equal the positive supply voltage $+Vs$ when transistors Q1 and Q3 are non-conductive. In order to prevent saturation of buffer amplifier A1 (which otherwise would reduce the peak separator responsive time) the attenuator R9-R11 translates the quiescent voltage of Q3 to a lower level within the linear range of amplifier A1. Illustratively, resistors R7, R9 and R11 may be equal valued. Amplifier A1 is a unity gain non-inverting amplifier (e.g., an emitter follower) and provides a relatively low output impedance. Capacitor C1 removes the d.c. component from the output signal produced by amplifier A1 and potentiometer R13 raises the circuit output impedance to provide controlled current drive to input 35 of compressor 36.

Complementary symmetry is used to advantage in FIG. 2 for producing the positive and negative peak output signals. Q2, for example, is the complement of Q1 and Q4 is the complement of Q3. The collector, emitter and bias voltages for even numbered elements are complementary to those for odd numbered elements. Because of this, operation of the even numbered elements is identical to that just described for the odd numbered elements with the exception that all signal polarities are reversed (the chrominance signal at terminal 50, for example, must be more negative than $-Vb$ $-V_{be}$ of Q2 for Q2 to turn on). An advantage of the complementary symmetry of the circuit is that there is excellent tracking of the positive and negative peak signal processing elements thereby enhancing the accuracy, stability and detection symmetry of the peak separator circuit.

The remaining elements of FIG. 2 provide controllable limiting of the separated peaks of the chrominance signal. For positive peak limiting the collector load resistor R7 and Q2 is coupled via series connected diodes D1, D3 and D5 to the wiper of potentiometer R15 the resistive body of which is coupled between the positive supply voltage source $+Vs$ and ground. Diodes D1, D3 and D5 and poled in a sense to be forward biased whenever the collector voltage of Q2 is less positive than the wiper voltage less the sum of the diode voltage drops. For negative peak limiting, the collector load resistor R8 of Q4 is coupled via series connected diodes D2, D4 and D6 to the wiper of potentiometer R16 the resistive body of which is coupled between the negative supply voltage source $-Vs$ and ground. Diodes D2, D4 and D6 are poled in a sense to be forward biased whenever the collector voltage of Q4 is less negative than the wiper voltage plus the sum of the diode voltage drops. In either case, forward biasing of one or the other of the diode strings will reduce the gain of the respective amplifier stage Q3 or Q4, thereby effectively limiting the magnitudes of the output signals produced at terminals 201 and 204. The previous comments regarding the complementary symmetry of FIG. 2 apply as well to the method of limiting the output signals.

What is claimed is:

1. Video signal processing apparatus, comprising:
    filter means for separating a composite video input signal into a luminance component and a chrominance component;
    first signal processing means for preemphasizing said luminance component of said input signal;
    second signal processing means for compressing said chrominance component in response to peaks in excess of a given value of a control signal supplied thereto;
    means for summing the preemphasized luminance component produced by said first signal processing means with the controllably compressed chrominance component produced by said second signal processing means to produce an output composite video signal for application to a frequency modulator means; and
    means for deriving said control signal from a selected one of (1) said chrominance component of said composite video input signal, (2) a sum of said chrominance component of said composite video input signal and said preemphasized luminance signal and (3) said output composite video signal.

2. Video signal processing apparatus as recited in claim 1 further comprising means in said second signal processing means for limiting the magnitude of the compression provided by said signal processing means to a predetermined value.

3. Video signal processing apparatus as recited in claim 1 wherein said second signal processing means comprises:
    signal separator means responsive to said control signal for producing an output signal representative of said peaks of said control signal;
    limiter means for limiting the magnitude of the output signal of said signal separator means to a predetermined magnitude; and
    circuit means of compressing said chrominance component in response to an output signal produced by said separator means and limited by said limiter means.

4. Video signal processing apparatus for converting a composite video input signal of a first format to a composite video output signal of a second format, said apparatus comprising:

comb filter means for separating said input composite video signal into a luminance component and a chrominance component;

preemphasis means for preemphasizing high frequency components of said luminance component;

clipping means for clipping the preemphasized luminance component at a predetermined level;

means for frequency translating the chrominance component;

amplitude compressing means for compressing the frequency translated chrominance component in response to a first control signal supplied thereto;

peak separator means, responsive to a second control signal supplied thereto for producing said first control signal in response to peaks of said second control signal in excess of a given value;

combining means for combining the preemphasized and clipping luminance component produced by said preemphasis means and said clipping means with the compressed frequency translated chrominance signal produced by said amplitude compressing means to produce said composite video output signal; and means for deriving said second control signal from a selected one of (1) said frequency translated chrominance component, (2) a sum of said frequency translated chrominance component and said preemphasized and clipped luminance component or (3) said composite video output signal.

5. Apparatus as recited in claim 4 further comprising limiter means for limiting the magnitude of said first control signal to a given magnitude.

6. Apparatus as recited in claim 5 further comprising means for periodically clamping said second control signal to a predetermined potential level.

7. Apparatus as recited in claim 5 further comprising means for periodically clamping the compressed frequency translated chrominance component produced by said amplitude compressing means to a predetermined potential level.

* * * * *